INVENTOR.
*Henry Hershey*

United States Patent Office 3,420,043
Patented Jan. 7, 1969

3,420,043
SAFETY ROTARY BLADE FOR A LAWNMOWER
Henry Hershey, Chinook, Wash. 98614
Filed Feb. 14, 1966, Ser. No. 527,206
U.S. Cl. 56—295                                5 Claims
Int. Cl. A01d *55/18*

ABSTRACT OF THE DISCLOSURE

A rotary blade for a lawnmower having four or more cutting blades fixed to and joining three concentric circular ring guards on the circumference of a circular metallic plate which is attached to the mower motor shaft.

---

This invention relates to grass cutting devices, and more particularly a safety rotary blade for a lawnmower.

It is therefore the main purpose of this invention to provide a safety rotary blade for a lawnmower wherein the cutting blades are prevented from contacting any object but grass.

Another object of this invention is to provide a safety rotary blade for a lawnmower wherein a plurality of guard members are secured to said rotary blade for rendering maximum protection to said blade.

Another object of this invention is to provide a safety rotary blade for a lawnmower wherein said blade may be easily removed from the guard members for replacement or cleaning purposes.

Still another object of this invention is to provide a safety rotary blade for a lawnmower which is inexpensive to manufacture and provides maximum safety to the operator of a lawnmower.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
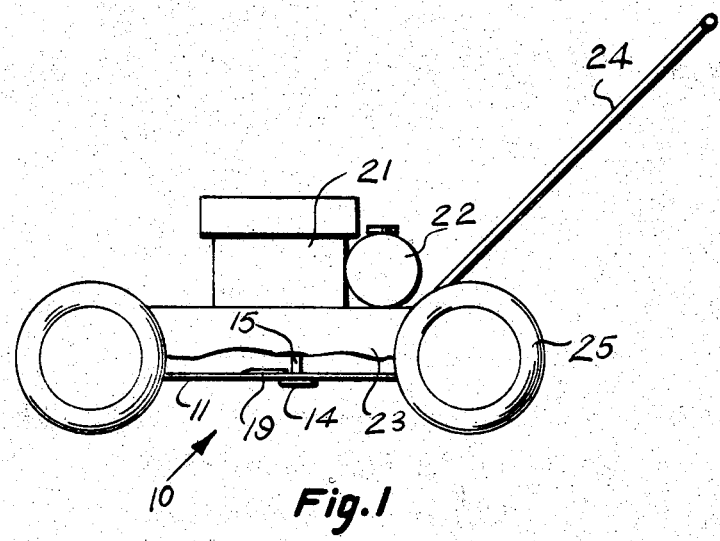
FIGURE 1 is a fragmentary view of a lawnmower.
Figure 2:
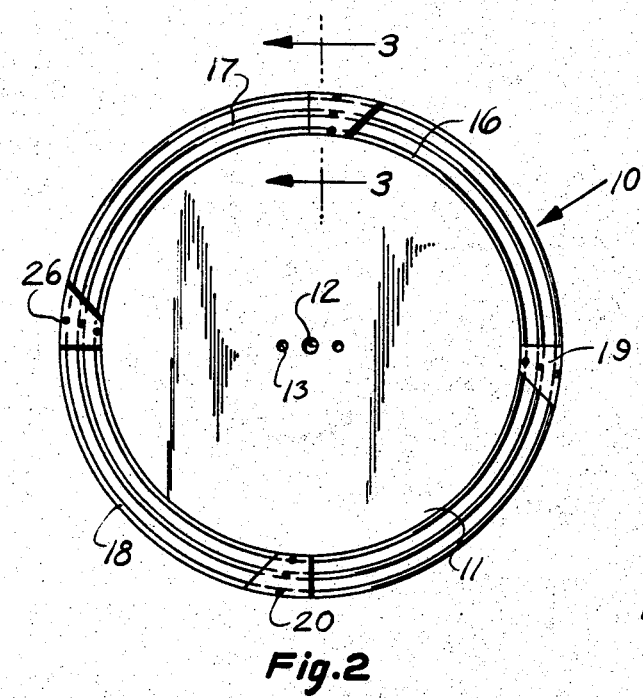
FIGURE 2 is a view depicting the positioning of cutting blades in relationship to the support plate and guard members.
Figure 3:
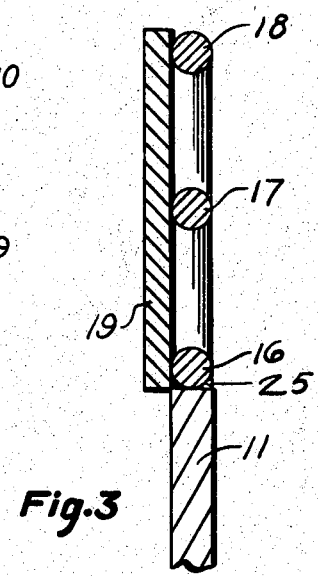
FIGURE 3 is a sectional view taken along the lines 3—3 of FIGURE 2.

According to this invention, a safety rotary blade for a lawnmower is provided with a circular metallic plate 11 having a centrally located hole 12 for positioning of shaft 15 which is downwardly extending from motor 21 and terminates at the support plate 14. In addition, circular plate 11 is provided with a pair of smaller holes 13 for admitting screws (not shown) of support plate 14 which provides additional rigidity to circular plate 11. The periphery of circular plate 11 is weldingly secured at 25 to a circular guard member 16 which is adapted to firmly support cutting blade 19. Said blade is provided with a plurality of holes 20 for securing said blade to a second circular member 17 which is of greater diameter than member 16. Furthermore, a third circular member 18 having diameter greater than member 17 is adapted to be secured to blade 19 by means of threaded screws 26 which are inserted into holes 20 of at least one of blades 19. It should be noted that blades 19 are mounted on the top portion of circular members 16, 17 and 18 thereby rendering maximum safety to the operator of the lawnmower.

FIGURE 1 shows that blade 19 is well inside within frame 23 which is supported on wheels 25. Push bar 24 is mounted into said frame 23 which also supports gas tank 22 and a motor 21.

It will also be noted that circular guard members 17 and 18 are dependent on the cutting blades 19. That is, if said blades would be broken by a hard object, such as stone, the dependent circular members 17 and 18 would clatter or break loose from circular plate 11 thereby attracting the attention of the operator of the lawnmower.

What I now claim is:

1. A safety rotary blade for a lawnmower comprising a circular disc like support adapted to be rotatably attached to the shaft of the engine of said lawnmower, a first metallic annular ring weldingly attached to the circumference of said support, a plurality of cutting blades removably secured to said first ring, second and third outwardly spaced concentric annular rings removably secured to the bottom portions of said blades, said third ring being coextensive with the outer extremities of said blades and constituting a means for supporting said blades and protecting them from being damaged during the operation of said lawnmower.

2. The rotary blade according to claim 1, wherein said metallic support includes a circular metallic plate having a centrally positioned hole therein adapted to admit said shaft of said engine, and said circular plate having at least a pair of auxiliary holes for securing said plate to a support member.

3. The rotary blade according to claim 1, wherein the upper portion of each said ring is provided with threaded holes for admitting the screws of said cutting blade therein.

4. The rotary blade according to claim 1, wherein each of said blades is provided with a plurality of holes which are adapted to admit a plurality of screws for securing said blades to the top portion of each of said rings.

5. The rotary blade according to claim 1, wherein each of said cutting blades is a metallic plate of trapezoid configuration having both of its ends sharpened for cutting grass and weeds.

References Cited

UNITED STATES PATENTS

| | | | |
|---|---|---|---|
| 2,716,323 | 8/1955 | Ford | 56—295 |
| 3,078,573 | 2/1963 | Kern | 30—347 |
| 3,097,469 | 7/1963 | Belfiore | 56—295 |
| 3,097,704 | 7/1963 | Gillespie | 172—540 |
| 3,283,488 | 11/1966 | Franklin | 56—295 |
| 3,336,737 | 8/1967 | Belfiore | 56—295 |
| 3,338,039 | 8/1967 | Nightingale et al. | 56—295 |

ALDRICH F. MEDBERY, *Primary Examiner.*

U.S. Cl. X.R.

30—347